United States Patent
Golan et al.

(10) Patent No.: US 8,112,361 B2
(45) Date of Patent: Feb. 7, 2012

(54) METHOD AND SYSTEM FOR DYNAMIC, REAL-TIME ADDITION OF ADVERTISEMENT TO DOWNLOADED STATIC CONTENT

(75) Inventors: Ronny Golan, Tel Aviv (IL); Ariel Napchi, Tel Aviv (IL)

(73) Assignee: Hiro Media Ltd., Tel-Aviv (IL)

( * ) Notice: Subject to any disclaimer, the term of this patent is extended or adjusted under 35 U.S.C. 154(b) by 312 days.

(21) Appl. No.: 11/571,609

(22) PCT Filed: Aug. 10, 2005

(86) PCT No.: PCT/IL2005/000866
§ 371 (c)(1),
(2), (4) Date: Jan. 4, 2007

(87) PCT Pub. No.: WO2006/016365
PCT Pub. Date: Feb. 16, 2006

(65) Prior Publication Data
US 2008/0097915 A1      Apr. 24, 2008

Related U.S. Application Data

(60) Provisional application No. 60/599,876, filed on Aug. 10, 2004.

(51) Int. Cl.
*G06F 21/00* (2006.01)
(52) U.S. Cl. ............ 705/54; 705/57; 705/902; 705/903; 463/40; 455/3.06
(58) Field of Classification Search ....................... 705/54
See application file for complete search history.

(56) References Cited

U.S. PATENT DOCUMENTS

| 5,809,481 | A | * | 9/1998 | Baron et al. ................. 705/14.4 |
| 5,864,870 | A | * | 1/1999 | Guck ........................ 707/104.1 |
| 5,892,900 | A |   | 4/1999 | Ginter et al. |
| 6,112,186 | A | * | 8/2000 | Bergh et al. .................... 705/10 |
| 6,192,340 | B1 |  | 2/2001 | Abecassis |
| 6,505,169 | B1 | * | 1/2003 | Bhagavath et al. ............. 705/14 |
| 6,519,571 | B1 | * | 2/2003 | Guheen et al. ................. 705/14 |
| 6,587,834 | B1 |  | 7/2003 | Dixon, III |
| 6,768,980 | B1 | * | 7/2004 | Meyer et al. .................. 704/500 |
| 7,177,873 | B2 |  | 2/2007 | Komatsu |

(Continued)

FOREIGN PATENT DOCUMENTS

WO           WO 01/16666          3/2001

(Continued)

OTHER PUBLICATIONS

WIPO International Search to WO 2006/016365 A3. All pages. Retrieved from WIPO website on Jan. 20, 2010.*

(Continued)

*Primary Examiner* — Andrew J. Fischer
*Assistant Examiner* — Calvin Cheung (57) ABSTRACT

A method and system for dynamic, real-time addition of advertisements to downloaded static content. The method comprises seamlessly combining a downloaded original content file with personalized information on a user device, and allowing the user either to use the combined original content and personalized information without possibility of personalized information removal, or to remove the personalized information after a fee payment. The seamless combination and removal operations are done by a player located in the user device.

26 Claims, 6 Drawing Sheets

U.S. PATENT DOCUMENTS

| | | | |
|---|---|---|---|
| 7,360,160 B2 * | 4/2008 | Matz | 715/716 |
| 7,363,291 B1 | 4/2008 | Page | |
| 7,475,404 B2 | 1/2009 | Hamel | |
| 7,877,468 B2 * | 1/2011 | Abadir et al. | 709/223 |
| 2001/0023436 A1 * | 9/2001 | Srinivasan et al. | 709/219 |
| 2002/0010679 A1 * | 1/2002 | Felsher | 705/51 |
| 2002/0040323 A1 * | 4/2002 | Lee et al. | 705/26 |
| 2002/0083043 A1 * | 6/2002 | Hoshi et al. | 707/1 |
| 2002/0092019 A1 * | 7/2002 | Marcus | 725/37 |
| 2002/0099798 A1 * | 7/2002 | Fedorovsky et al. | 709/219 |
| 2002/0120515 A1 * | 8/2002 | Morimoto et al. | 705/14 |
| 2002/0154703 A1 * | 10/2002 | Kubota et al. | 375/260 |
| 2002/0184047 A1 * | 12/2002 | Plotnick et al. | 705/1 |
| 2003/0009452 A1 * | 1/2003 | O'Rourke et al. | 707/3 |
| 2003/0014310 A1 * | 1/2003 | Jung et al. | 705/14 |
| 2003/0018581 A1 | 1/2003 | Bratton et al. | |
| 2003/0149975 A1 * | 8/2003 | Eldering et al. | 725/34 |
| 2003/0170000 A1 * | 9/2003 | Iwashita et al. | 386/46 |
| 2003/0187740 A1 * | 10/2003 | Tanahashi et al. | 705/14 |
| 2003/0221541 A1 * | 12/2003 | Platt | 84/609 |
| 2004/0024727 A1 * | 2/2004 | Bowman | 707/1 |
| 2004/0088412 A1 * | 5/2004 | John et al. | 709/226 |
| 2004/0117370 A1 | 6/2004 | Dutta et al. | |
| 2004/0221018 A1 * | 11/2004 | Ji | 709/217 |
| 2005/0033700 A1 * | 2/2005 | Vogler et al. | 705/57 |
| 2005/0055644 A1 | 3/2005 | Stockton | |
| 2005/0108414 A1 | 5/2005 | Taylor et al. | |
| 2005/0119976 A1 | 6/2005 | Taylor et al. | |
| 2005/0273514 A1 | 12/2005 | Milkey et al. | |
| 2006/0036488 A1 | 2/2006 | Golan et al. | |
| 2006/0143675 A1 | 6/2006 | Willis et al. | |
| 2006/0253327 A1 * | 11/2006 | Morris et al. | 705/14 |
| 2006/0253328 A1 * | 11/2006 | Kohli et al. | 705/14 |
| 2006/0253544 A1 * | 11/2006 | Luoma et al. | 709/217 |
| 2006/0282864 A1 * | 12/2006 | Gupte | 725/89 |
| 2007/0220575 A1 | 9/2007 | Cooper et al. | |
| 2007/0226057 A1 | 9/2007 | Laruelle et al. | |
| 2008/0319862 A1 | 12/2008 | Golan et al. | |
| 2010/0030692 A1 | 2/2010 | Turakhia | |

FOREIGN PATENT DOCUMENTS

| | | | |
|---|---|---|---|
| WO | WO 02/35331 A2 * | 2/2002 | |
| WO | WO03/065219 A1 * | 8/2003 | |
| WO | WO2004/036384 A2 * | 4/2004 | |
| WO | WO 2006/016365 | 2/2006 | |

OTHER PUBLICATIONS

Supurovic, P. "MPEG Audio Frame Header." Apr. 9, 2003. MPGEDIT.ORG. All pages. Retrieved via Wayback Machine on Aug. 13, 2010. <http://web.archive.org/web/20030409040132/http://mpgedit.org/mpgedit/mpeg_format/mpeghdr.htm>.*

International Preliminary Report on Patentability Dated Feb. 26, 2007 From the International Bureau of WIPO Re.: Application No. PCT/IL2005/000866.

International Search Report Dated Sep. 12, 2006 From the International Searching Authority Re.: Application No. PCT/IL05/00866.

Response Dated Dec. 8, 2009 to Official Action of Jul. 9, 2009 From the US Patent and Trademark Office Re.: U.S. Appl. No. 11/571,609.

Written Opinion Dated Sep. 12, 2006 From the International Searching Authority Re.: Application No. PCT/IL05/00866.

Official Action Dated Feb. 2, 2010 From the US Patent and Trademark Office Re.: U.S. Appl. No. 11/571,609.

Response Dated Dec. 8, 2009 to Official Action of Jul. 9, 2009 From the US Patent and Trademark Office Re.: U.S. Appl. No. 11/571,609.

Communication Pursuant to Article 94(3) EPC Dated Apr. 27, 2010 Including Supplementary European Search Report and the European Search Opinion Dated Oct. 7, 2009 From the European Patent Office Re.: Application No. 05771963.5.

Examiner's Report Dated Mar. 30, 2010 From the Australian Government, IP Australia Re. Application No. 2005270833.

Office Action Dated Jun. 29, 2011 From the Israel Patent Office Re. Application No. 180520 and Its Translation Into English.

Official Action Dated Nov. 24, 2010 From the US Patent and Trademark Office Re. U.S. Appl. No. 12/203,936.

Response Dated Aug. 11, 2010 to Communication Pursuant to Article 94(3) EPC of Apr. 27, 2010 From the European Patent Office Re.: Application No. 05771963.5.

* cited by examiner

METHOD AND SYSTEM FOR DYNAMIC, REAL-TIME ADDITION OF ADVERTISEMENT TO DOWNLOADED STATIC CONTENT

FIELD OF THE INVENTION

The present invention relates in general to file-sharing related content distribution over mass media, and more particularly to systems and methods for reducing the damages caused by illegal content distribution and theft by adding personalized information to downloaded content as it is being used (i.e. viewed/played) by a user.

BACKGROUND OF THE INVENTION

In the past few years, Internet piracy of music, movies and books caused losses of billions of dollars to content owners. "Content" as used in the present invention refers to "static" content, i.e. content that does not change from one view to another. Static content includes entertainment and publishing industry products such as music, movies, books, etc, distributable electronically in digital or analog formats. Specific examples include video (movie), audio (music, podcasts, audio books etc.), text, e-books, presentations and images. In contrast, "dynamic" content (such as SW programs, computer games etc.) is interactive in nature and may change each time it is used according to the users' inputs.

The ease with which every Internet user can download almost any static content and use it without paying royalties to the content owner, is a major concern for music companies, production studios and book publishers. In order to fight this phenomenon, content owners try to take legal actions against users who download content illegally, conduct educational school campaigns and even try passing legislation that will close all file-sharing networks.

The addition of advertisements ("ads") to static content files is known. US Patent Application 2004024727 to Bowman discloses a method and system for adding advertisements to peer-to-peer files through a network router. The system sits on the network router within a broadband provider and can change files being downloaded by customers of this provider. A major disadvantage of this solution is that it needs to be deployed within all broadband providers worldwide to enable all users to view the content with advertisements, this being patently unfeasible.

US Patent Application 2002099798 to Fedorovsky et al describes the adding of advertisements to files in a client-server environment. When the client requests to download content, the server sends the content plus some personalized ads. The ads are bundled with the content during the download and are not stored separately on the user's device. This solution does not work in a file-sharing environment, which has a completely different architecture. Moreover, the ads are added to the file during the download process and not in real time, when the content is being viewed.

Patent Application WO2004036384 to Huber et al describes the addition of advertising in a broadcasting environment (streaming). Streaming solutions cannot enable users to collect content, to view content offline or to share content through file-sharing networks and therefore cannot work in a download environment.

Patent Application WO03065219 to Berkson et al describes a method and system for delivering "free" media content via a network or the Internet, whereby media content files are bundled with advertisements. The bundling of ads with the content has several drawbacks:

1) Each file is different from the others (which have different ads) and thus it is impossible to enjoy the benefits of file-sharing, where the same file can be downloaded from different users and save download time.
2) Since the user has all the information and since all the ads are held separately, it is relatively easy for hackers to build a player that will remove the ads from the content. Furthermore, it is impossible to implement territorial rights management, as users can download the whole content from their peers.
3) The personalization capabilities are very limited—as long as an ad has not expired, it will not change even if a completely different user will view it.
4) Advertisers want to limit the total amount of times a certain ad is being viewed or the total number of viewers who view the ad (in order to control their expenditure). This cannot be done in this invention.

Since file-sharing is one of the best distribution tools ever invented, it would be advantageous to provide content owners with a way to leverage the file-sharing success and make a profit of it, rather than closing the file-sharing networks. Furthermore, when millions of people can share the same content file, the need arises to personalize the content to each user while used, with the content file itself being unchanged.

SUMMARY OF THE INVENTION

The present invention discloses systems and methods for adding dynamically, in real-time, personalized information to downloaded content viewed/played by a user on a user device, thereby reducing the damages caused by illegal content distribution and theft. A user device refers to any device that can play/view or otherwise enable a user to use downloaded content, e.g. a personal computer (PC), a laptop computer, a PDA, a mobile telephone, a DVR (Digital Video Recorder), a MP3 player, a personal movie player, an e-book, etc. In contrast with the present situation, due to this invention, content owners can profit from file-sharing instead of losing revenue. The invention enables these owners to distribute their content through any type of "digital distribution method" (such as direct downloads, file-sharing, email, IM (Instant Messengers), chat-rooms, newsgroups, etc.), while adding ads to downloaded content each time it is viewed by a user.

In this disclosure, "added materials" refers to parts removed from the original content ("missing parts", see below) plus personalized information (which includes ads plus extra information). The ads can be in the format of (but not limited to) video, audio, banners, images, animation, links and interactive content. "Extra" information (also referred to as "extra", "extras" and "extra-files") may include links to relevant information or e-commerce sites, images that are appended to the content, subtitles, voiceover, links to additional downloads, forms for feedback on the ads, a way to rate the content, text added to the content (for example: Instant Messaging or remarks sent by users to their peers), etc. Since the addition of the personalized information is done on the user device by a player (preferably a software (SW) program), the invention also provides security features that prevent hackers from hacking the player and removing the personalized information from the content.

The ads may be personalized and changed with each viewing. For example, a first user can download a movie and while viewing it, the player adds in real-time ads in pre-defined places. If the user watches the movie for a second time, the movie may include different ads. If a second user, with a different profile, downloads the same movie from the first user, he will also see it with yet other different ads and information. This is achieved by creating a special set of CODECs (COder DECoder) or file formats that may be based on existing CODECs (such as MPEG4, DivX, Xvid, MP3, pdf, doc, Jpeg, etc.) and which can show the content and append the ads in the appropriate places in real time.

Current file sharing networks work in 'swarming' technology, in which the same file can be downloaded from multiple sources in parallel. The more popular a certain file, the faster the download time. In case two files differ in one bit, they are considered to be different files and cannot enjoy the advantages of swarming. In the present invention, the fact that the personalized information is not part of the content itself enables the files to be shared through file-sharing networks and enjoy a faster download speed. While all the users have the exact same copy of the content, they may view different ads, subtitles, voiceover and information when viewing the content. A user may download the content to any user device by various "distribution methods". While the content file is being downloaded, a dedicated client (preferably another SW program that runs on the user device) connects to a dedicated server (referred to hereinafter as the "ad/content server"). After receiving authorization, the client downloads the added materials required for viewing the movie. After the content is viewed, the client may update the server with "rating" information, e.g. which file and which ads were viewed. This forms a rating system that gives advertisers precise information regarding the reach of their campaign and enables accurate billing.

A user can choose to pay a certain sum and either reduce the number of ads or even remove them completely from the content. Each content file has a corresponding generic 'Meta-file' a file that includes information on parameters such as the number, length and placement of the ads and the extras. This Meta-file is downloaded from the ad/content server and personalized ("personalized Meta-file") for each specific user. This allows changing various parameters (e.g. the number, place and length of the ads) without changing the content itself. This also allows content providers to offer their content with ads that will be removed after a certain number of users viewed it.

The security features to prevent hacking include treating parts of the content as if they were ads and adding them to the content in real time. In some embodiments, the original content file may be divided into at least two parts, with the user enabled to download part of the content, with at least one other part missing. When supplied later with added materials that include the missing parts and ads (plus optionally extras), the player cannot differentiate between the ads and missing parts, these being "seamlessly" combined with the rest of the original content. Consequently, a hacker who tries to remove the ads will also remove content (e.g. movie, audio or text) parts.

The personalization of the added materials may follow parameters ("personalization parameters") such as country, language, age, gender, current content viewed, history of content viewed and respective content rating, history of ads viewed, user preferences, etc. The invention provides advertisers with latitude re. number and frequency of ad showing per user. It also provides ad skipping prevention options According to the present invention there is provided a method for dynamic, real-time addition of advertisements to downloaded static content comprising the steps of: on a user device, seamlessly combining a downloaded original content file with personalized information, and allowing the user to use the downloaded original content file, whereby the user may either use the original content and personalized information without being able to separate the personalized information from the original content or may remove the personalized information for a fee, thereby being allowed to use only the original content.

According to the present invention there is provided a system for dynamic, real-time addition of advertisements to downloaded static content comprising: an encoder operative to encode a downloadable original content file in a special format; at least one server operative to receive the encoded original content file from the encoder and to process added materials; and a user device operative to receive from the at least one server the encoded original content file and the personalized information and to seamlessly combine the personalized information with the encoded original content for use by a user.

According to the present invention there is provided a system for dynamic, real-time addition of advertisements to downloaded static content comprising: an encoder operative to encode a downloadable original content file in a special format; at least one server operative to process the special format encoded content file and added materials; a client residing on a user device and operative to perform new content checking and synchronization with the at least one server; at least one player in communication with the at least one server and with the client and residing on the same user device, each player operative to seamlessly combine the personalized information with the encoded original content for use by a user.

BRIEF DESCRIPTION OF THE DRAWINGS

For a better understanding of the present invention and to show more clearly how it could be applied, reference will now be made, by way of example only, to the accompanying drawings in which.

DETAILED DESCRIPTION OF THE INVENTION

Figure 1A:
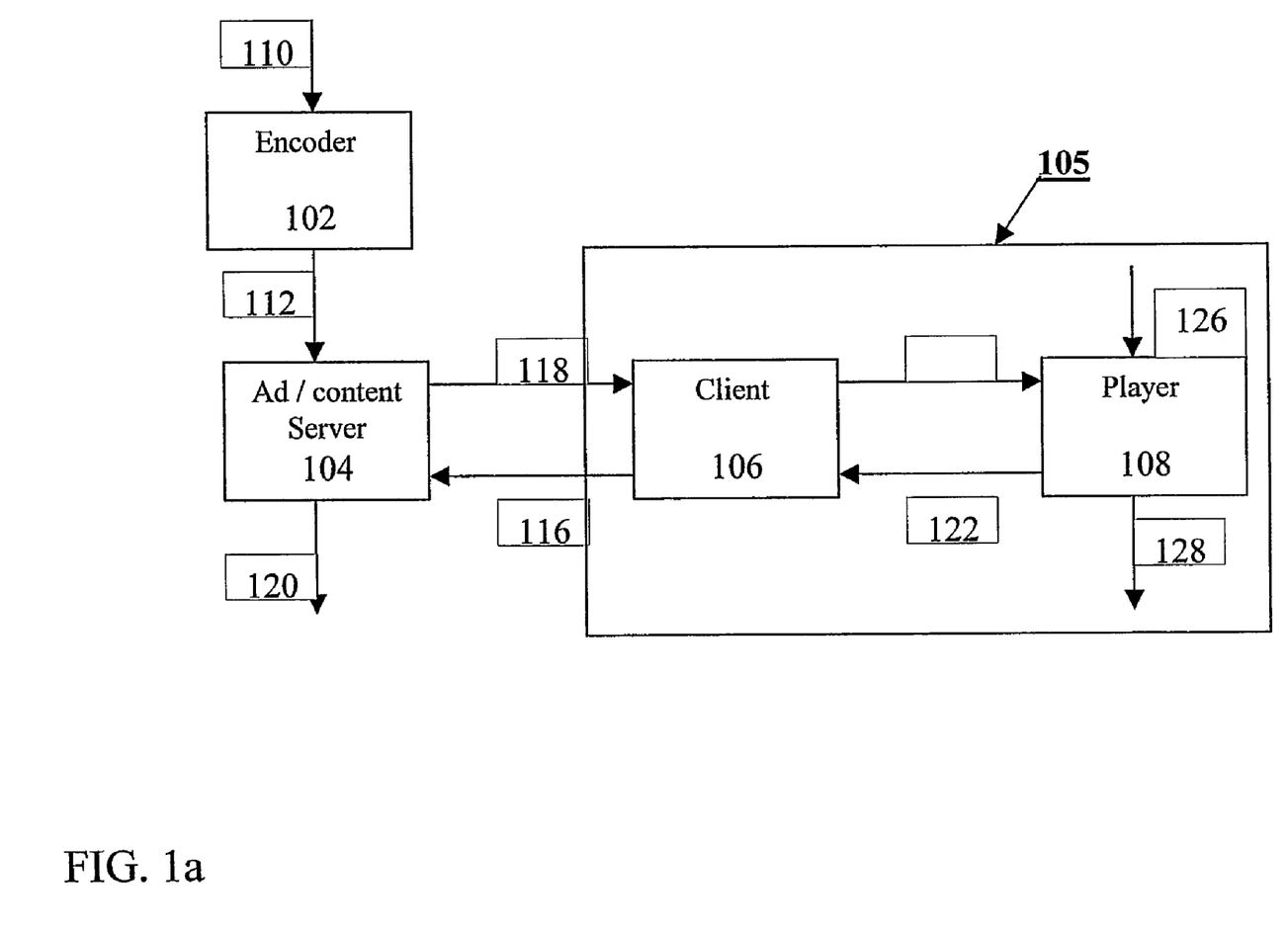
FIG. 1a shows a preferred embodiment of a system for dynamically adding ads to downloaded content according to the present invention.

FIG. 1a shows a preferred embodiment of a system 100 for dynamically adding ads to downloaded content according to the present invention. System 100 comprises an encoder 102, at least one ad/content server 104 and a user device 105 that includes a client 106 and a player 108, interconnected as shown. Ad/content server 104 may optionally be split into separate added materials and content servers (see FIG. 2). Embodiments in which the two servers are combined or separate should be considered as equal within the context of the invention. The description continues with a combined ad/content server for purposes of convenience only. As mentioned, the client and the player are typically SW programs running on device 105. Briefly, encoder 102 is used for encoding content files into a special format that can be decoded later by the player, the encoded files passed to server 104 as an input 112. Server 104 is operative to perform a host of functions including (but not limited to) ad personalization management, authentication, data management and data mining, based on content input 112 and client information inputs 116 received from client 106. As mentioned, client 106 is typically a SW program that may be located on any device. The client is operative to perform a host of functions including (but not limited to) checking the device for newly downloaded content, synchronizing (making sure the right ads and personalized information exists on the device so that the player can play the movie) with the server and supplying the player with the required added materials (see below). Player 108 is operative to perform a host of functions including (but not limited to) appending of added materials into the content, acquiring and relating rating information to the client and content manipulation options.

Figure 1B:
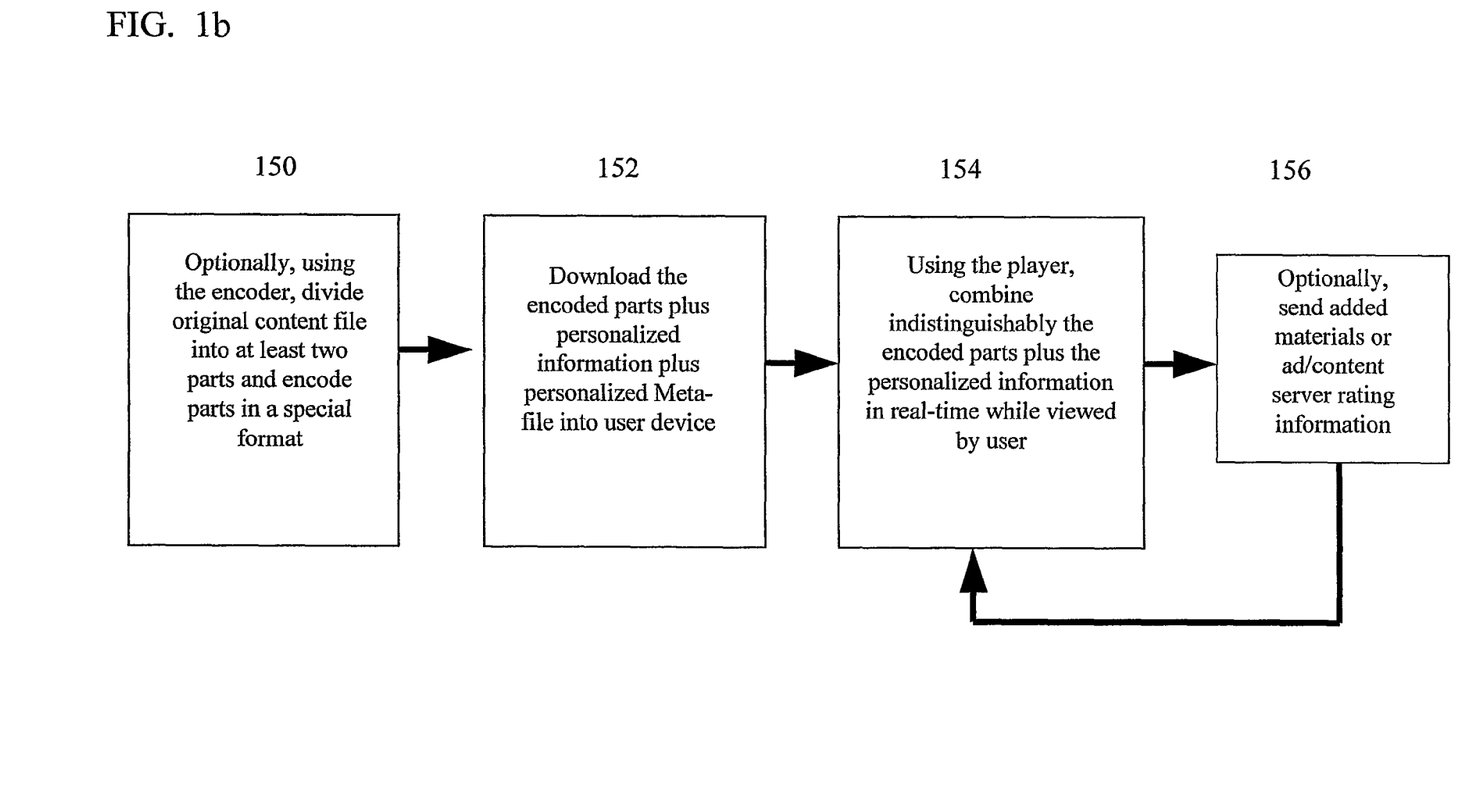
FIG. 1b shows a schematic flow chart of the method of the present invention.

FIG. 1b shows schematically the main steps of the method of the present invention. In step 150, the encoder optionally divides the original content file into two or more parts and encodes them in a special format. The division means removing part of the original file, leaving a "modified original file" and creating at least one "missing parts" file. Note that this step is optional, and that in some embodiments, the original downloadable content file is left intact. In step 152, the encoded files (original file or the divided files) plus personalized information and a personalized Meta-file (prepared by the server 104) are downloaded into a user device. In step 154, the modified original content, missing parts and personalized information files are combined by the player according to instructions provided in the personalized Meta-file and made available to the user. In an optional step 156, the player sends through the client rating information to the server. After the viewing ends, the client performs another synchronization with the server and downloads new ads so that at the next viewing, the content is shown with potentially different ads and extras.

The actions in step 154 may be further subdivided into two substeps: first, the user downloads the modified original content file through the content server or any other distribution method into the user device, then the client downloads the added materials from the ad/content server. Note that in step 154, the user plays (e.g. for a video) the content and the player appends the ads and optionally the extras to the video while the video is being viewed, without any visible or audible disruption (i.e. seamlessly).

The functions of the various elements will become clearer upon the more detailed description hereinbelow. This description uses digital video files as exemplary of downloaded content. It should be apparent to one skilled in the art that the description applies equally well to all other types of content as defined above.

Encoder 102

The encoder receives as an input 110 un-encoded digital video files (movies or ads) and encodes them into the special format used by the system. The encoder removes sections from the movie (these becoming the "missing parts"), and creates a generic Meta-file with tags where ads, missing parts and extras should come in. The encoder further encrypts the data if necessary, tags the file as an encoded file, provides a unique identification (ID) to the movie and outputs output 112 that includes the encoded video file, the encoded missing parts (in case the digital video file is a movie and not an ad) and the generic Meta-file. This output is passed to and stored in the ad/content server.

Ad/Content Server 104

The server receives two main inputs: output 112 from the encoder and information 116 from client 106. This information may include users' details and preferences, details regarding which movies and ads the user has on his/her device and rating information (which movies and ads the user viewed and when). The server is operative to perform at least the following operations:

a. Ad and extras personalization management (optional): a special algorithm running on the server is designed to find the best matches between the ads, extras and the movies present on the user's device. The algorithm exemplarily takes into consideration the personalization parameters. After deciding upon the specific ads to be sent to the user, it constructs the personalized 'Meta-file', which includes information on the specific ads and extras that will be viewed by the user on top of the information of the generic 'Meta-file'.

b. Authentication (optional): the server checks that the user is allowed to view the content (for example age and country verification) before passing him/her all the extra files needed for the viewing.

c. Management layer: the server manages all the data of the different users, movies and added materials and ensures that all the clients are constantly updated with the right added materials.

d. Data mining (optional): allows the advertisers and the content owners to view the statistics regarding the viewing of their content and ads.

The server outputs two outputs:

a. An update output 118 that includes updates for the clients. Typically, after the server gets a synchronization request from a client and performs the ad matching, it sends the client all required personalized information, missing movie parts and personalized Meta-files that will enable the users to view the movies. Note that each client has only one user (although it may be that several users using the same device are considered as one user), but a specific user may use several clients on different devices The server also instructs the client which files are already obsolete and can be deleted.

b. An optional statistics and billing information output 120: The server provides detailed statistical reports to the advertisers, e.g. how many times their ad was watched (and consequently how much they need to pay)

Client 106

The client receives 2 main inputs: output 118 of server 104 and optionally a rating information input 122 from the player. The client is operative to perform the following operations:

a. New content checking: the client checks the user device for new videos downloaded in a particular format (used by the encoder). This can be done, for example, either by: a) 'listening' to all the files that are being saved on the device and checking their file type and header to see if each is an encoded file, or; b) by scanning the device periodically to find new encoded movies or; c) by reception of an indication from an ad/content server 104 that the file is being downloaded by the user or; d) by reception of an indication from the file-sharing software (not shown) or; e) in other ways known in the art. In case such a file is detected, the client checks its ID and performs synchronization with the server.

b. Synchronization: the client runs a periodic synchronization with the server at predetermined intervals, after a new encoded file was detected on the device, or after other specific events (such as after a file has been viewed etc.). During the synchronization, the client sends the server information on all the files present on the device (ads, movies and missing parts) as well as rating information. Following the synchronization, the client receives the required files it needs and may be instructed to delete some files from the device if they are obsolete. Synchronization also occurs when a user tries to play a video for which the client does not have the updated added materials. This can occur because the user was offline for a very long time, or; if the client, for some reason, did not detect that the user downloaded this specific content, or; if the client did not have the time to perform a synchronization from the time the content was saved to the time it was played.

c. File supply to the player: After a user plays a video, the player contacts the client and requests from it all the added materials for the movie just played. The added materials and the personalized Meta-file are passed to the player. The client and the player cannot differentiate between the missing movie parts and the ads. Consequently, hackers who will try to hack the player and remove all the ads will also remove some parts of the movie. Advantageously, it is therefore impossible to remove the ads without removing some parts of the movie.

The client has two main outputs: information output 116 to the server and an information and files output 124 to the player, through which it sends the player all the files and information required to play a specific movie requested by the user.

Player 108

As mentioned, the system includes at least one player, and more typically several different players for the different content types (video, audio, pictures, text etc.). The player is a key element of the system. A video player is described here in detail by way of example only. The system may either use a dedicated video player or use one of the existing players (such as a Windows media player, a Real Player, etc.) with a special plug-in that knows how to treat the system's files and play them correctly. For example, when an existing player opens the file, it detects it is encoded in a special format that is registered in the registry of the computer. Consequently the player knows to use a special SW to play this type of file.

The player receives two inputs: information and files output 124 of the client, and a user functions input 126 from a user Input 126 allows a user to perform various control functions on the content (video movie), e.g. play, stop, fast-forward or rewind, press on a link within the movie and more. The player is operative to perform the following operations:

a. Added materials appending: the player inserts the added materials into the movie, as it is played in real-time. The player needs to fill the video buffers with information from the different files so that the transition between the main movie and the clips (either the ad or the missing part) will be flawless and seamless. This can be done exemplarily as follows: the special SW requests the client for the personalized Meta-file and the added materials. According to the data in the personalize Meta-file, the player constructs a special data structure that holds pointers to all of these files. As it plays the main movie, it knows from the Meta-file when there is a need to play the ads and missing parts. When it gets to the queue that predicts a need to jump and play the video from a different file, it starts to fill the video and audio buffers from that file. Since the buffers are always filled in advanced with the right information, the user will not detect any disturbance when viewing the file. The adding of the extra information can exemplary be done by adding a filter to the video player that knows to add a certain image or text to each frame of the video (by changing the bits in run-time) and checking if and where the user clicked the mouse. When the movie is being loaded, the player also needs to calculate the total length of the movie (which includes the main movie plus the missing parts plus all the ads) and present it to the user in order to give accurate information regarding the movie's length. Each time the user plays the movie he/she may get different ads and different personalized information, even though the main movie file never changes and is stored on the users' device. The player can also decide to skip on certain parts of the movie (in case, for example, the viewer is too young) and show only a 'censored' version. It is also possible to show videos with several possible ends or parts, in which the user can choose interactively which end he would like to see.

b. Ad skipping disabling (optional): In case a user tries to fast-forward or rewind during an ad, this function will be locked. Furthermore, a fast-forward/rewind to a point directly after the ad is impossible, thus preventing the user from stopping the movie before the ad break and then Fast-forwarding to a point immediately after the ad break. In this case the movie may be forwarded to a point several minutes after the ad, thus forcing the user to miss parts of the movie.

c. Rating information (optional): after an ad or a movie is being viewed, the player passes the rating information to the client.

The player has two main outputs: an optional rating information output 122 to the client, and a movie (content) output 128. The movie is being played for the user with all the personalized information appended to it. This movie may have different ads/personalized information each time it is viewed by the user and for each different user who views it. Note that the player and the client may be implemented also as one SW program that performs all of these tasks.

Figure 2:
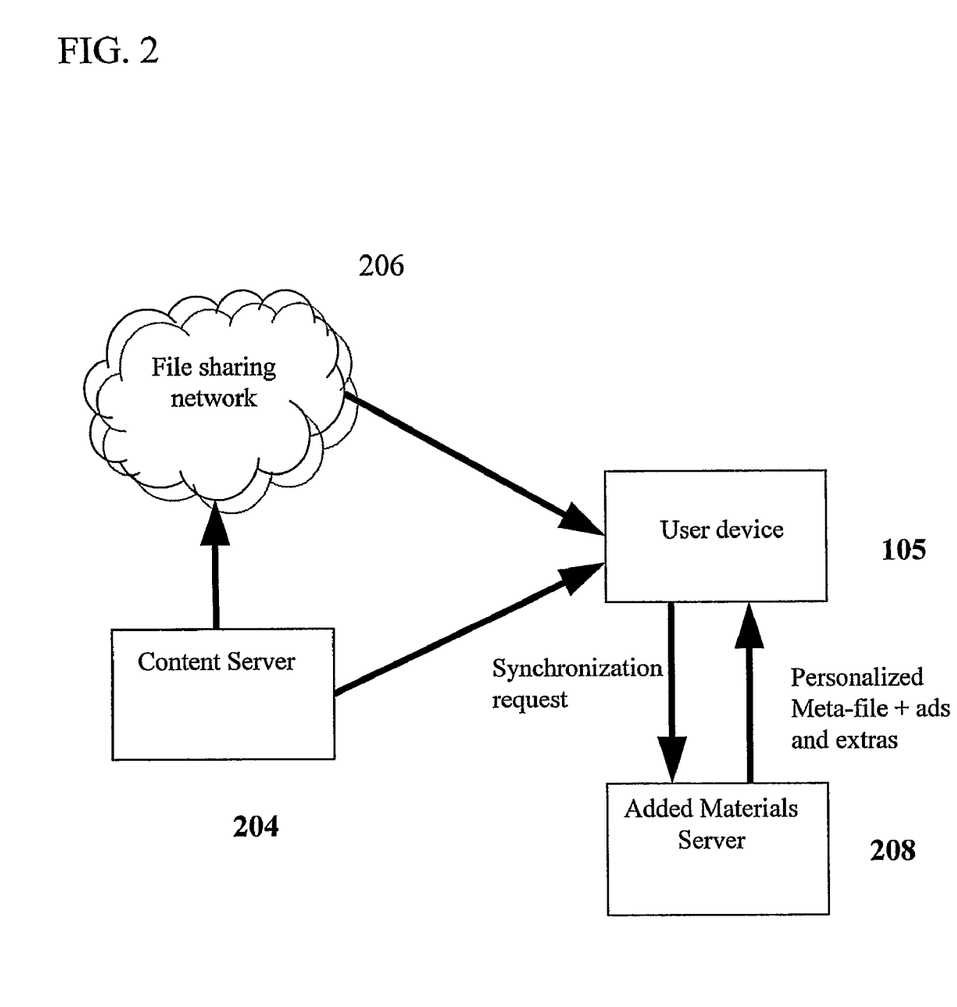
FIG. 2 shows schematically a download process of the content file, ads and "extras" to a storage or viewing device.

Each of the main cited operation performed by the main elements of the system are now described in more detail:

FIG. 2 shows schematically a download process of a content file to device 105. The downloading may be done through any digital distribution method.

Client 106 detects the specific content being downloaded. After detecting that a user has downloaded the content file, the client sends a request to server 208 to download the added materials. After an appropriate authentication (see FIG. 3) the server decides which personalized ad(s) and/or extras to send to each user (according to the personalization parameters) and constructs the personalized Meta-File. Server 208 sends the required files to the client. The client is able to play the content only after receiving the files.

Figure 3:
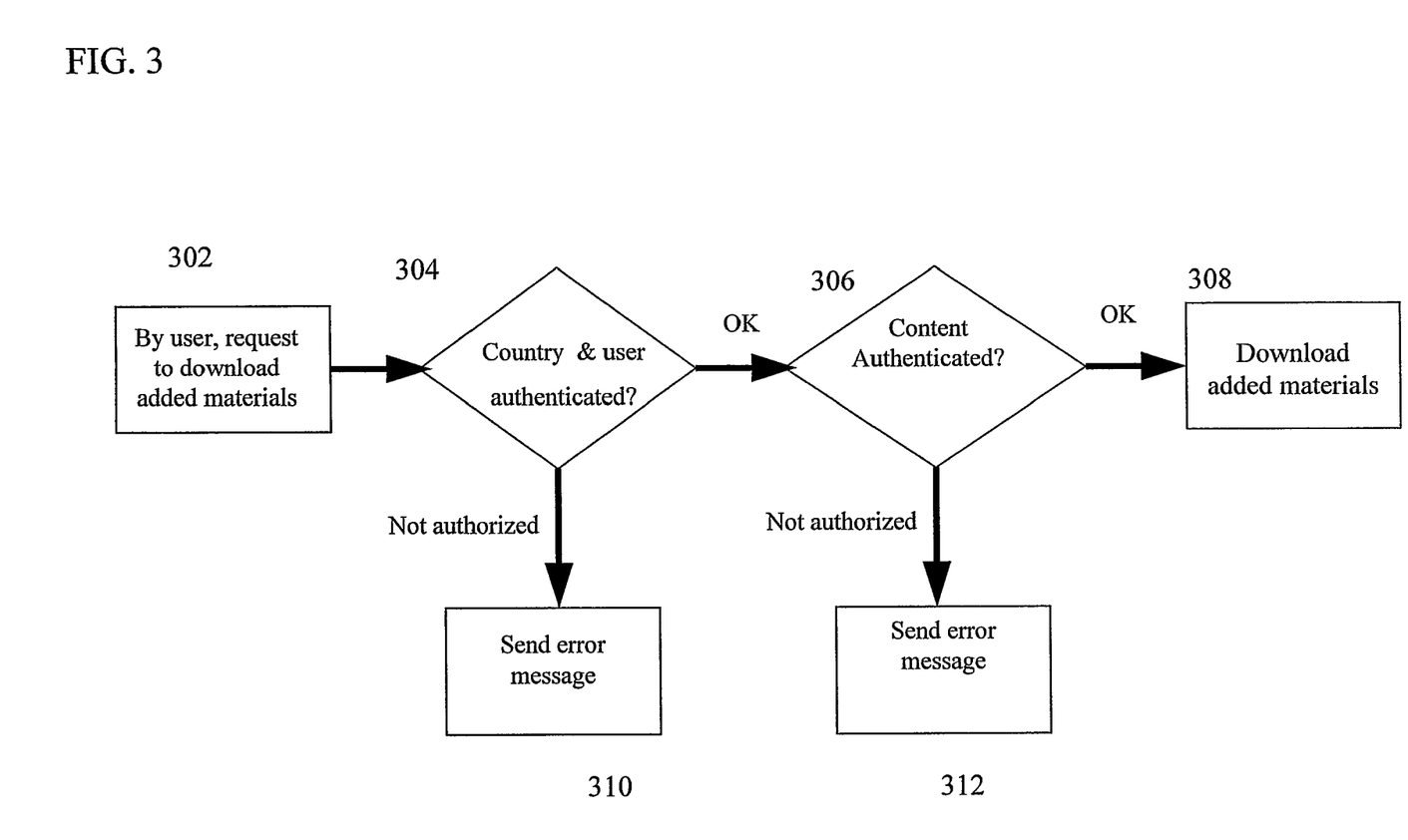
FIG. 3 shows a schematic flow chart of an exemplary client request authentication process.

FIG. 3 shows a schematic flow chart of an exemplary client request authentication process. Note that this process is optional, and that the method may be performed without it. In step 302, the user requests ad/content server 104 to download the added materials. In step 304, the server checks the user country (either through his/her IP or through a different registration process). The server may block the download of the content on the basis of the user country or other characteristics (such as age) and may send the user an appropriate message. This is extremely important in the case of rated content and because most content distribution rights are territorial and not global. If the country and other user information are correct ("OK"), the server authenticates the content itself in step 306. This authentication is essentially a 'self-destruct' mechanism that enables content providers to prevent users from further viewing content distributed to the users at an earlier stage. If both the content and the user information were authenticated successfully, the client downloads all the added materials in step 308 and the user is able to view the content. If the check fails in any of authentication steps 304 and 306 ("Not authorized"), a respective error message is sent (steps 310 and 312) to the user by the player or the client.

Figure 4:
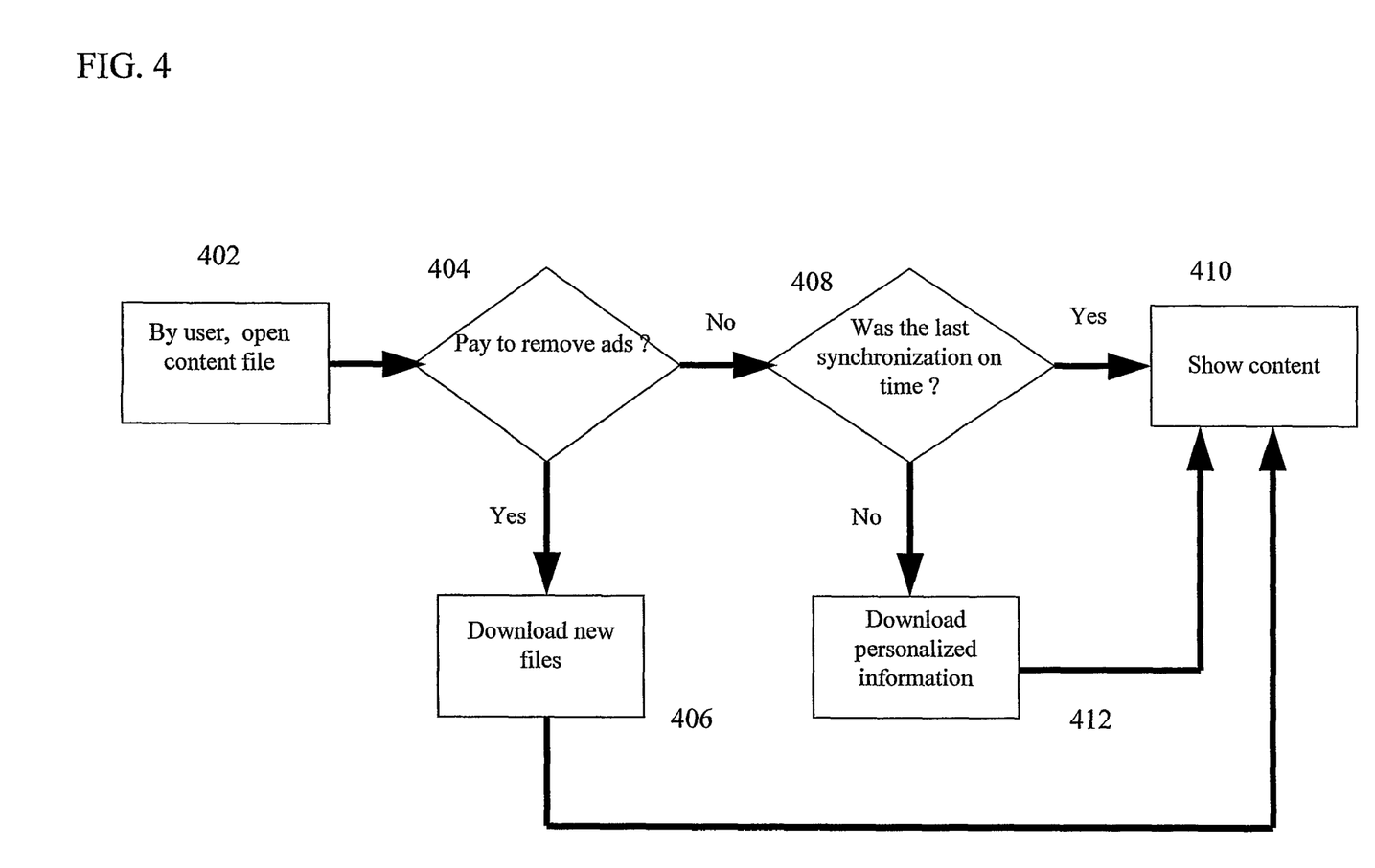
FIG. 4 shows a schematic flow chart of an exemplary process of payable ad removal and checking the validity of the ads.

FIG. 4 shows a schematic flow chart of an exemplary process of payable ad removal. A user opens a content file in step 402. The client asks the user if he/she wishes to pay in order to remove the ads in step 404. If the user chooses to pay ("yes") and his/her payment is authenticated, the server sends a new personalized Meta-file in a "download new files" step 406. This allows the player/viewer to show the content without the ads in a "show content" step 410. If the user chooses not to remove the ads ("No"), the client checks in step 408 if the last synchronization with the server happened during the last X days. This is done in order to prevent the player from showing an ad that is old and is not paid anymore by the advertiser. If "Yes" in step 408, the content is shown to the user in step 410. If "No" in step 408 (i.e. in case some of the ads are old) the client uses either extra ads that are stored locally or, if needed, requests the server to send new ads. Since this check is done by the client periodically as well, it is highly likely that there will be no need to download new materials from the server. However, if such need arises, the personalized information is downloaded in step 412. After this phase is completed, the content is shown to the user in step 410. In order to improve the user experience and prevent him/her from waiting till the synchronization is over, it is possible to start and play the film and perform the synchronization with the server at the same time. Note that these are separate actions performed in parallel on two different threads. The device plays the content and at the same time downloads the needed extras.

Figure 5:
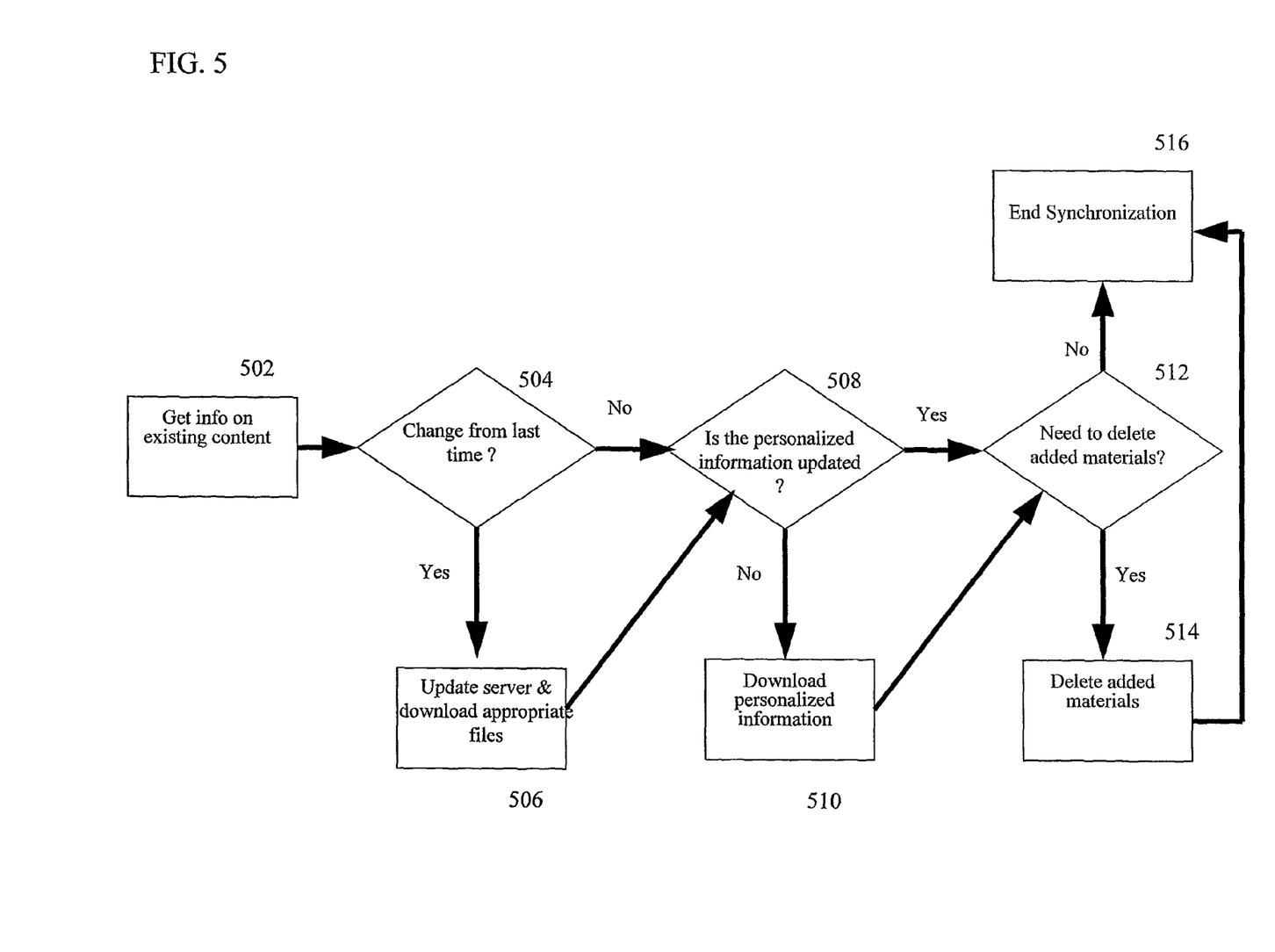
FIG. 5 shows a schematic flow chart of an exemplary ad and extra features management process run by the client.

FIG. 5 shows a schematic flow chart of an exemplary added materials management process run by the client. In order to improve the user-experience, the client has to download the added materials of the movie as close as possible to the downloading of the content. The client can also hold a pool of 'spare ads' that can be inserted into content, thereby avoiding additional downloads when the user wishes to view the content. At each synchronization with the server, the client obtains information regarding the existing content on the users' device (as described in more detail above) in step 502. After obtaining the information, the client checks if there was any change from a previous check in step 504. If there was ("Yes"), the client updates the server (so it will hold updated information on the content's distribution) and downloads the appropriate files in step 506. If "no" in step 504 or after step 506, the client checks if the personalized information expired in step 508. This is exemplarily done according to the expiration date or the total number of times a certain ad was viewed, in order to avoid showing ads that are not being paid for. In this step, the server can also send a new personalized Meta-file that may perform any of the following: change the number of ads in a certain piece of content (as the content becomes, for example, older and cheaper), add or remove links or other extra features and more. If the personalized information is not updated ("No"), the client downloads new personalized information to replace it in step 510. If it is updated ("Yes"), the client checks in step 512 if there is a need to delete some of the added materials. If yes, the files are deleted in step 514. The synchronization with the server is ended in step 516.

In summary, the present invention discloses a new technology, systems and methods of use that can support an alternative business model to allow users to download content for free or for a reduced fee in return for viewing ads. The way the system is built allows the users not only to download the content directly from dedicated servers, but also to download it through file-sharing networks, since all of the 'personalized' features are held separately from the content itself. This means that many different users can share the exact same file, while each one will get different ads and information during the viewing of the content.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for dynamic, real-time addition of advertisements to modified content comprising the steps of:
   a) providing static content;
   b) providing at least one advertisement;
   c) dividing the static content to form a modified content from which at least one missing part has been removed, the missing part being a section of the static content;
   d) forwarding additional material which includes at least one advertisement and the at least one missing part to a user device in a first communication session; and
   e) forwarding the modified content to said user device in a second communication session;
   f) wherein said first and second communication sessions are different from one another and the additional material and the modified content are set to allow the user device to combine them in real time and to play the combination with at least one seamless transition between the modified content and the at least one missing part.

2. The method of claim 1, wherein the additional material comprises personalized information; further comprising managing the personalized information by periodically contacting a server that ensures that the personalized information is up-to-date.

3. The method of claim 2, wherein the contacting a server includes, sending the server the personalized information on files present on the user device.

4. The method of claim 2, wherein the step of managing personalized information includes checking if the personalized information is up-to-date and if not, downloading updated the personalized information.

5. The method of claim 2, wherein the step of managing the personalized information includes checking if the personalized information is up-to-date and if not, deleting the personalized information from the user device.

6. The method of claim 2, wherein the step of managing the personalized information includes receiving a notification when a content file is being downloaded and contacting the server to download the personalized information relevant to the downloaded content file.

7. The method of claim 1, wherein the modified content includes content selected from the group consisting of video, audio, text, viewing digital content, an e-book and an image.

8. The method of claim 1, wherein the step of combining includes combining the modified content with the at least one missing part and the at least one advertisement, whereby the combining of the modified content with the at least one missing part reconstructs the static content that seemingly combine between the modified content and the at least one missing part.

9. The method of claim 8, wherein the combining the modified content with the additional material includes providing to the user device a personalized Meta-file with combined information which includes data placement information for the placement of the at least one missing part and the at least one advertisement within the modified content.

10. The method of claim 1, further comprising the steps of:
   e) viewing the combined modified content and the additional material offline;

f) saving the additional material on the viewed combined modified content and the additional material on the user device; and g) reporting the saved additional material to a server when the user device comes online.

11. The method of claim 1, wherein the modified content is downloaded from a first source and the additional material being downloaded from a second source.

12. The method of claim 11, wherein each the source is a different server.

13. The method of claim 1, wherein said additional material and said modified content are provided from separate servers.

14. The method of claim 1, wherein said static content comprises playable video content and each said missing part comprises a playable section of said video content.

15. The method of claim 1, wherein the playing time of said combination is longer than the playing time of said static content.

16. A method for dynamic, real-time addition of advertisements to static content comprising the steps of:

a) separately receiving, on a user device, modified content from a first source, the modified content being formed from static content from which at least one missing part has been removed, the missing part being a section of the static content;

b) separately receiving, on said user device, additional material from a second source, the additional material including at least one advertisement and the at least one missing part; and c) combining, in real time, the modified content and the additional material, on said user device such that the static content is reconstructed with at least one seamless transition between the modified content and the at least one missing part and appended with the at least one advertisement;

wherein the first and second sources are different from one another and the modified content and the Additional Material are received via separate communication sessions.

17. The method of claim 16, further comprising managing the additional material so as to include up-to-date personalized information by periodically contacting a server that provides the personalized information to ensure the personal information is up-to-date.

18. The method of claim 17, wherein the contacting a server includes, sending the personalized information on files present on the user device.

19. The method of claim 17, wherein the step of managing the personalized information includes checking if the personalized information is up-to-date and if not, downloading updated personalized information.

20. The method of claim 17, wherein the step of managing the personalized information includes checking if the personalized information is up-to-date and if not, deleting the personalized information from the user device.

21. The method of claim 17, wherein the step of managing the personalized information includes receiving a notification when a content file is being downloaded and contacting the server to download personalized information relevant to the downloaded content file.

22. The method of claim 16, wherein the modified content includes content selected from the group consisting of video, audio, text, a viewing digital content, an e-book and an image.

23. The method of claim 16, further comprising the step of:

e) encoding the at least one missing part and the at least one advertisement to have the same traits such that the at least one missing part and the at least one advertisement cannot be distinguished by a player on the user device.

24. The method of claim 16, further comprising the steps of:

e) viewing the combined modified content, at least one missing part and the at least one advertisement offline;

f) saving the additional material on the viewed modified content, at least one missing part and the at least one advertisement on the user device; and g) reporting the saved additional material to a server when the user device comes online.

25. A system for dynamic, real-time addition of advertisements to static content comprising:

a) a first server operative to:
  i. receive, static content, and
  ii. divide the static content to form a modified content from which at least one missing part has been removed, the missing part being a section of the static content;

b) a second server operative to:
  i. receive the at least one missing content,
  ii. receive at least one at least one advertisement,
  iii. create additional material comprising the at least one advertisement and the at least one missing content;

c) a user device operative to:
  i. receive, the modified content from the first server,
  ii. receive the additional material from the second server,
  iii. combine the modified content with the additional material in real time for use by a user, and
  iv. play the combined modified content and the additional material with at least one seamless transition between said which at least one missing content and the modified content; and said modified content and the additional material are provided in separate communication sessions.

26. The system of claim 25, wherein the first server is operative to divide the static content into the modified content and at least one missing content part, wherein the user device is further operative to separately receive the modified content and the at least one missing content part and to combine the modified content, the at least one missing content part and the at least one advertisement in real time for use by the user.

* * * * *